United States Patent
Chuang

(10) Patent No.: US 7,929,211 B2
(45) Date of Patent: Apr. 19, 2011

(54) OPTICAL FILM

(75) Inventor: Shih-Yi Chuang, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 0 days.

(21) Appl. No.: 11/898,096

(22) Filed: Sep. 10, 2007

(65) Prior Publication Data

US 2008/0074892 A1    Mar. 27, 2008

(30) Foreign Application Priority Data

Sep. 22, 2006    (TW) .............................. 95217029 U

(51) Int. Cl.
*G02B 27/10* (2006.01)
(52) U.S. Cl. .................. 359/619; 359/621; 359/623
(58) Field of Classification Search .................. 359/619, 359/536, 621–624
See application file for complete search history.

(56) References Cited

U.S. PATENT DOCUMENTS

| | | | |
|---|---|---|---|
| 6,169,633 B1 * | 1/2001 | Watanabe | 359/626 |
| 6,900,941 B2 * | 5/2005 | Kaminsky et al. | 359/599 |
| 7,213,936 B2 * | 5/2007 | Wang et al. | 362/223 |
| 7,391,571 B2 * | 6/2008 | Lee et al. | 359/619 |
| 2003/0072080 A1 * | 4/2003 | Ariyoshi et al. | 359/487 |
| 2005/0248848 A1 * | 11/2005 | Whitehead et al. | 359/619 |
| 2006/0114569 A1 * | 6/2006 | Capaldo et al. | 359/619 |
| 2006/0232859 A1 * | 10/2006 | Ebina et al. | 359/455 |
| 2006/0285214 A1 * | 12/2006 | Haga et al. | 359/619 |

* cited by examiner

*Primary Examiner* — Jessica T Stultz
*Assistant Examiner* — Mahidere S Sahle
(74) *Attorney, Agent, or Firm* — Bacon & Thomas, PLLC

(57) ABSTRACT

An optical film comprises a transparent substrate including a top surface and a bottom surface; a micro-hemisphere layer disposed on the top surface of the transparent substrate and having a plurality of hemispheric projections, and an unsmooth diffusion layer disposed on the bottom layer of the transparent substrate. The micro-hemisphere layer condenses a light. The unsmooth diffusion surface diffuses a light.

4 Claims, 3 Drawing Sheets

OPTICAL FILM

BACKGROUND OF THE INVENTION

This invention relates to an optical film, and more particularly, to an optical film for a liquid crystal display.

DESCRIPTION OF RELATED ART

In order to acquire better viewing angle and color characteristics of a LCD, various attempts have been made. For example, it is known that the brightness of an LCD panel can be enhanced by increasing the number of lamps. However, this has a tendency of accumulating an excess of heat generated by the lamps in the panel, resulting in a short lifetime and a poor performance of constituting elements of the panel. Furthermore, a large amount of power consumption resulted from the increase in the number of lamps is not suitable for battery-powered portable applications. It has been considered the most economical and convenient approach to effectively increase the brightness of an LCD panel so as to make the best of a light source by employing various optical films in backlight modules without conducting any element change or extra energy consumption. One of the commonly known optical films is "Brightness Enhancement Film (BEF)" or a "Prism Film", which has a fine prism structure formed on a polyester optical film having a thickness of only 50-200 μm (microns) by curing a special acrylic resin with a high energy UV light on the polyester opticalfilm. The main function of BEF is to collect dispersive light emitted towards all directions from a light guide by refraction and total internal reflection, and to focus the light in an on-axis direction of about ±35 degrees, so as to enhance the luminance of an LCD.

Many prior art designs directed to the application of a brightness enhancement film in a backlight module have been disclosed.

Referring to FIG. 1, for example, a conventional brightness enhancement film 10 comprises a substrate 11 which has a top surface and a bottom surface. A condensing structure 12 is on only one surface, i.e., a top surface of the substrate 11. The bottom surface is smooth and cannot evenly diffuse and effectively condense the light from a light source. To address the above problems, one of commonly employed approaches in the industry is to provide a diffusion film under the brightness enhancement film. However, this results in cost incense and a complex backlight module.

SUMMARY OF THE INVENTION

Accordingly, an object of the present invention is to provide an optical film which can address the aforementioned problems as well as provide various advantages. The optical film of the present invention comprises a top surface which includes a micro-hemisphere layer, and a bottom surface which is an unsmooth surface. The light is diffused and uniformed by the unsmooth diffusion layer and then condensed by the micro-hemisphere layer. Therefore, with the optical film of the present invention, a better light uniformity and light condensation can be achieved.

Another object of the present invention is to provide an optical film for an LCD which is thin, lightweight, compact, and cost-effective.

To achieve these and other objects and advantages, an optical film in accordance with the present invention comprises a transparent substrate including a top surface and a bottom surface, a micro-hemisphere layer disposed on the top surface of the transparent substrate and having a plurality of micro hemispheric projections, and a unsmooth diffusion layer disposed on the bottom surface of the transparent substrate. The micro-hemisphere layer condenses a light, whereas the unsmooth diffusion layer diffuses a light.

Other objectives, advantages and novel features of the invention will become more apparent from the following detailed description and the accompanying drawings.

DETAILED DESCRIPTION OF THE INVENTION

Figure 1:
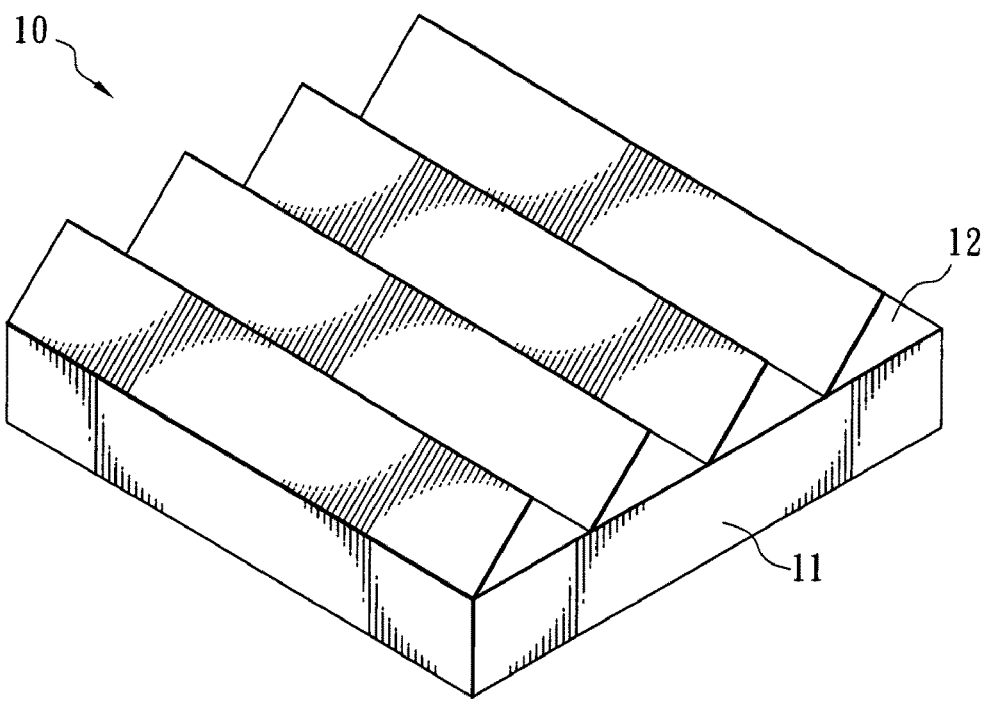
FIG. 1 is a schematic view of prior art brightness enhancement film.
Figure 2:
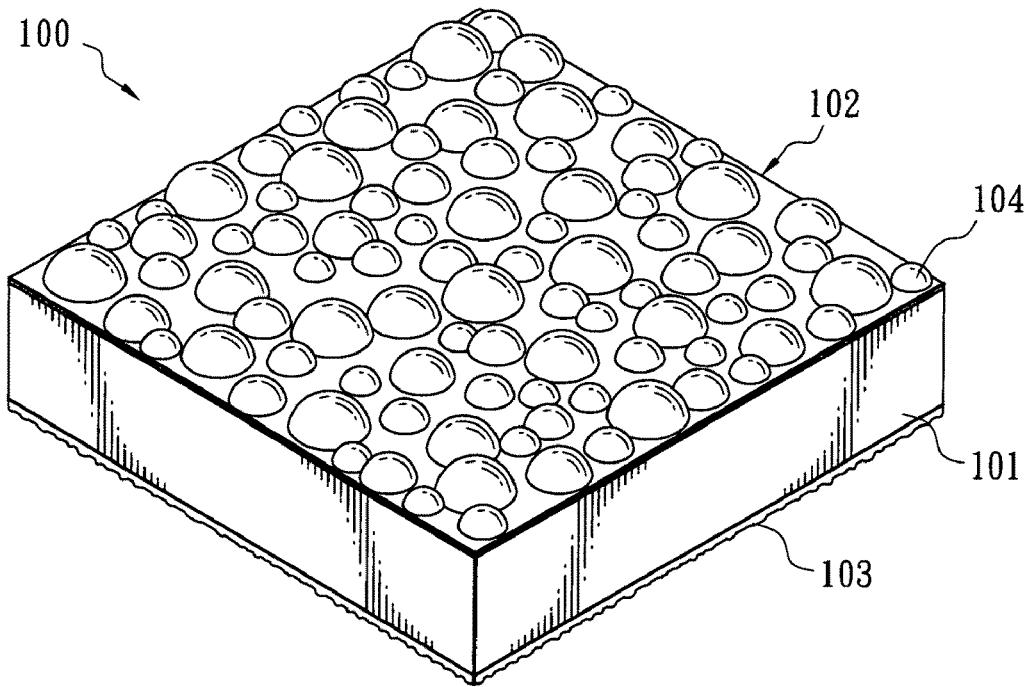
FIG. 2 is a perspective view of an embodiment of the present invention.

Referring to FIG. 2, an optical film 100 in accordance with the present invention is shown. The optical film 100 includes a transparent substrate 101, a micro-hemisphere layer 102 formed on a top surface of the transparent substrate 101, and a unsmooth diffusion layer 103 formed on a bottom surface opposite to the top surface of the transparent substrate 101.

The transparent substrate 101 used in the optical film 100 in accordance with the present invention may be any substrate known to those skilled in the art, such as glass or plastic. There are no specific restrictions with respect to the aforementioned plastic substrate including, but not limited to a polyester resin, such as polyethylene terephthalate (PET); a polyacrylate resin, such as polymethyl methacrylate (PMMA); a polyolefin resin, such as polyethylene (PE) or polypropylene (PP); a polyimide resin; a polycarbonate resin; a polyurethane resin; cellulose triacetate (TAC); or a mixture thereof. The thickness of the substrate basically depends upon the requirements of a desired optical product, preferably between about 50 microns and about 300 microns.

The micro-hemisphere layer 102 on the transparent substrate 101 is formed from resin. There are no specific restrictions with respect to the aforementioned resin including, but not limited to thermosetting resin or UV-curing resin, of which UV-curing resin is preferred. The aforementioned UV-curing resin may be, for example, but is not limited to acrylate resin. The suitable acrylate resin which can be employed here may be, for example, but is not limited to a (meth) acrylate resin, a urethane acrylate resin, polyester acrylate resin, an epoxy acrylate resin, or a mixture thereof, of which the (meth) acrylate resin is preferred. The aforementioned acrylate resin may contain one or more functional groups. Those containing multi-functional groups are preferred so as to raise the glass transition temperature.

Figure 3:
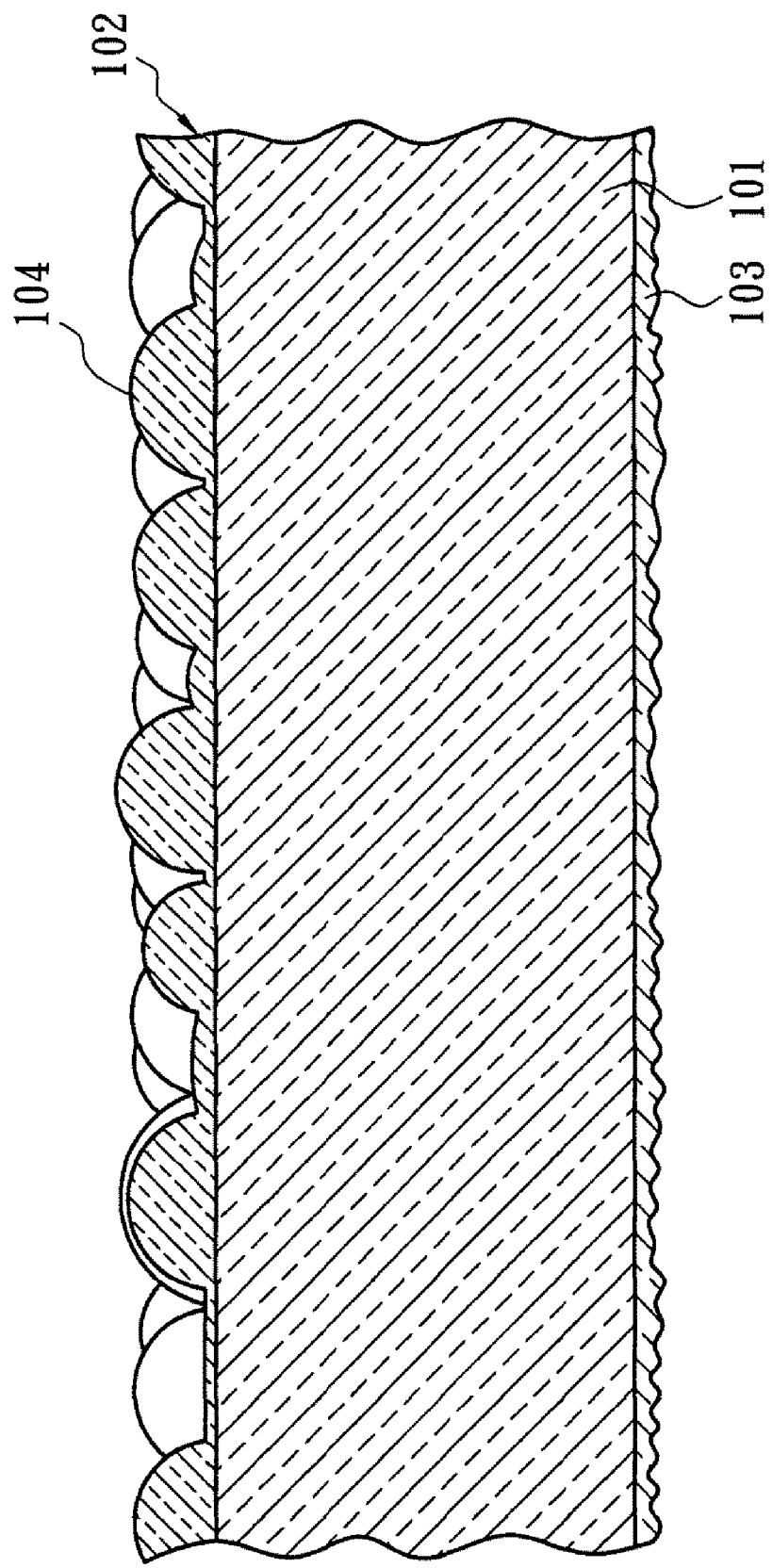
FIG. 3 is a side view of an embodiment of the present invention.
Figure 4:
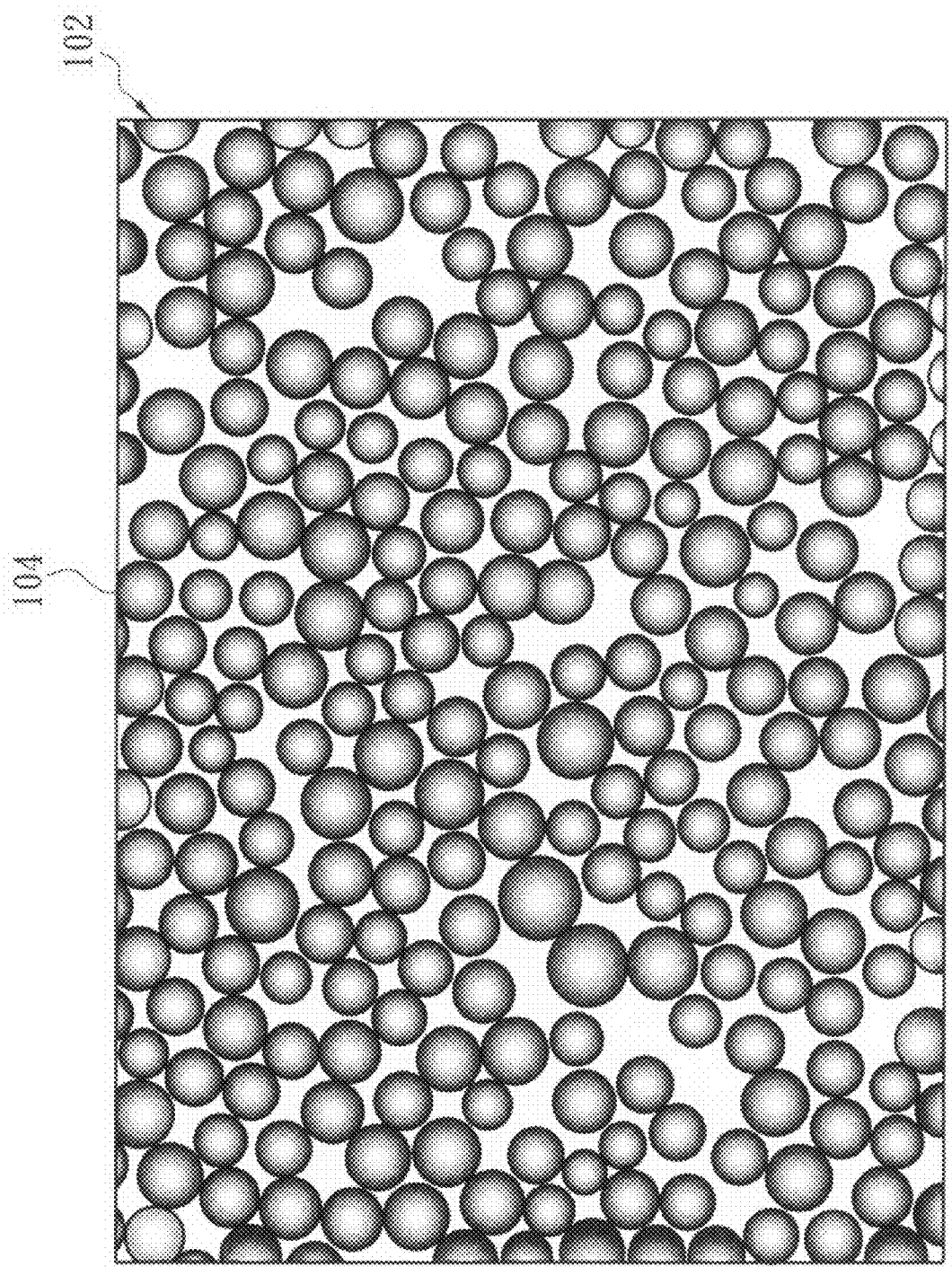
FIG. 4 is a partial front view of an embodiment of the present invention.

The optical film 100 in accordance with the present invention uniformly diffuses and condenses the light from a light source, and thus possesses both the features of a conventional brightness enhancement film and a diffusion film. Referring now to FIGS. 2 and 3, to achieve a light condensing effect, the micro-hemisphere layer 102 is formed on the top surface of the transparent substrate 101 as a light-condensing layer. As shown, the micro-hemisphere layer 102 includes a plurality of micro-hemispheres 104 for condensing a light. Referring to FIG. 4, the micro-hemispheres 104 includes hemispheres with various thicknesses in the range between 1 micron and 100 microns and refraction index in the range between 1.3 and 2.0. The above-mentioned resin which forms the micro-hemisphere layer 102 as a light-condensing layer may optionally contain any conventional additives, such as an inorganic filler, a leveling agent, a defoaming agent, and an anti-static agent, etc.

The micro-hemisphere layer 102 of the present invention can be formed by using any method known to those skilled in the art. The method comprises, for example, the following steps.

(a) mixing a resin and a photo initiator to form a colloidal coating composition;

(b) forming a coated layer on a transparent substrate by applying the colloidal coating composition on the transparent substrate;

(c) shaping the coated layer into a micro-hemispheres structure using roller embossing, hot transfer or hot extrusion; and (d) curing the coated layer by applying energy rays, heating, or the both.

Preferably, curing the coated layer at step (d) is carried by applying energy rays radiation so as to cause polymerization. The energy rays mentioned above include light sources having a certain range of wavelengths, such as UV, IR, visible light or heat ray (radiation), and UV is preferred. The intensity of radiation may be from 1 to 500 mJ/cm2, and an intensity in the range from 50 to 300 mJ/cm2 is preferred.

As shown in FIG. 3, the unsmooth diffusion layer 103 on the bottom surface of the optical film 100 in accordance with the present invention is an unsmooth surface, the forming process of which is known to those skilled in the art and may include, for example, but is not limited to screen printing, spraying, coating, or embossing. The unsmooth diffusion layer 103 can uniformly distribute light. In addition, with the unsmooth diffusion layer 103, the possible electrostatic attraction of particles during the operation can be reduced.

With the optical film 100 of the present invention, a light from a light source passing through the optical film 100 will be uniformly diffused by the unsmooth diffusion layer 103 and then be condensed by the micro-hemisphere layer 102. Therefore, the optical film in accordance with the present invention provides both light diffusion ability and light condensing ability. Accordingly, the optical film of the present invention can be used in a backlight module in a liquid crystal displays as a light diffusion brightness enhancement film.

It should be understood by those skilled in the art that various modifications, combinations, sub-combinations and alternations may occur depending on design requirements and other factors insofar as they are within the scope of the appended claims or the equivalents thereof.

The invention claimed is:

1. An optical film adapted for use in a backlight module, comprising:
  a transparent substrate including a top surface and a bottom surface;
  a micro-hemisphere layer disposed on the top surface of the transparent substrate and being formed from acrylate resin and having a plurality of micro hemispheric projections; and
  an unsmooth diffusion layer disposed on the bottom surface of the transparent substrate, wherein
  the transparent substrate is free of diffusion particles,
  the bottom surface is a light incident surface,
  the unsmooth diffusion layer diffuses light, and
  the micro-hemisphere layer condenses light and has a refractive index in the range between 1.3 and 2.0.

2. The optical film as claimed in claim 1, wherein the transparent substrate is glass or plastic.

3. The optical film as claimed in claim 1, wherein the thickness of the micro-hemisphere layer varies between 1 and 100 microns.

4. The optical film as claimed in claim 1, wherein the micro-hemisphere layer comprises micro-hemispheres of various thicknesses.

* * * * *